United States Patent
Court et al.

(10) Patent No.: US 8,869,553 B2
(45) Date of Patent: Oct. 28, 2014

(54) METHOD AND DEVICE FOR CRYOGENICALLY SEPARATING A MIXTURE OF HYDROGEN AND CARBON MONOXIDE

(75) Inventors: Philippe Court, Vincennes (FR); Antoine Hernandez, Chatenay Malabry (FR)

(73) Assignee: L'Air Liquide, Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 1046 days.

(21) Appl. No.: 12/937,549

(22) PCT Filed: Mar. 20, 2009

(86) PCT No.: PCT/FR2009/050484
§ 371 (c)(1),
(2), (4) Date: Nov. 29, 2010

(87) PCT Pub. No.: WO2009/144423
PCT Pub. Date: Dec. 3, 2009

(65) Prior Publication Data
US 2011/0056239 A1    Mar. 10, 2011

(30) Foreign Application Priority Data

Apr. 18, 2008 (FR) ...................... 08 52649

(51) Int. Cl.
*F25J 3/00* (2006.01)
*F25J 3/02* (2006.01)
*G01M 17/007* (2006.01)

(52) U.S. Cl.
CPC ............ *F25J 3/0233* (2013.01); *F25J 2230/32* (2013.01); *F25J 3/0261* (2013.01); *G01M 17/0078* (2013.01); *F25J 2215/14* (2013.01); *F25J 2210/18* (2013.01); *Y10S 62/92* (2013.01)
USPC .............................................. 62/617; 62/920

(58) Field of Classification Search
CPC ..... F25J 3/0261; F25J 3/0223; F25J 2210/18; F25J 2215/14
USPC .................... 62/920, 617–620, 630
See application file for complete search history.

(56) References Cited

U.S. PATENT DOCUMENTS 4,478,621 A    10/1984 Fabian
4,566,886 A    1/1986 Fabian et al.
(Continued)

FOREIGN PATENT DOCUMENTS

EP    1729077    12/2006
EP    1729077 A1 * 12/2006
(Continued)

OTHER PUBLICATIONS

Berninger, R., "Fortschritte Bei Der H2/CO-Tieftemperaturzerlegung//Progress in H2/CO Low Temperature Separation" Berichte Aus Technik Und Wissenschaft, Linde AG., Wiesbaden, DE, vol. 62, Jan. 1, 1988, pp. 18-32, XPoo0-45782, ISSN: 0942-332X.

(Continued)

*Primary Examiner* — Frantz Jules
*Assistant Examiner* — Keith Raymond
(74) *Attorney, Agent, or Firm* — Justin K. Murray

(57) ABSTRACT

A process and a device for the cryogenic separation of a mixture of hydrogen and carbon monoxide, in particular of a mixture having, as main components, hydrogen and carbon monoxide is presented.

16 Claims, 2 Drawing Sheets

(56) References Cited

U.S. PATENT DOCUMENTS

| | | | |
|---|---|---|---|
| 5,311,744 A * | 5/1994 | Sweeney et al. | 62/646 |
| 5,832,747 A * | 11/1998 | Bassett et al. | 62/630 |
| 6,266,976 B1 * | 7/2001 | Scharpf | 62/621 |
| 2002/0116944 A1 * | 8/2002 | McNeil | 62/620 |
| 2006/0254311 A1 * | 11/2006 | Billy et al. | 62/617 |
| 2009/0293539 A1 * | 12/2009 | Briglia et al. | 62/625 |
| 2010/0043489 A1 * | 2/2010 | Darde et al. | 62/631 |
| 2010/0199718 A1 * | 8/2010 | Briglia et al. | 62/630 |

FOREIGN PATENT DOCUMENTS

| | | |
|---|---|---|
| FR | 2911390 | 7/2008 |
| JP | 63163771 | 7/1988 |

OTHER PUBLICATIONS

Search Report for PCT/FR2009/050484.

* cited by examiner

METHOD AND DEVICE FOR CRYOGENICALLY SEPARATING A MIXTURE OF HYDROGEN AND CARBON MONOXIDE

CROSS REFERENCE TO RELATED APPLICATIONS

This application is a §371 of International PCT Application PCT/FR2009/050484, filed Mar. 20, 2009.

FIELD OF INVENTION

The present invention relates to a process and a device for the cryogenic separation of a mixture of hydrogen and carbon monoxide, in particular of a mixture having, as main components, hydrogen and carbon monoxide.

BACKGROUND

The units for the production of carbon monoxide and hydrogen can be separated into two parts:
generation of synthesis gas (mixture comprising $H_2$, CO, $CH_4$, $CO_2$, Ar and $N_2$ essentially). Among the various industrial routes for the production of synthesis gas, that based on coal gasification appears to become increasingly more prevalent, in particular in countries rich in coal deposits, such as China. The design of this unit, which comprises a reactor for the gasification of coal with oxygen and steam, is based on the required production of CO and the required production of hydrogen.
purification of the synthesis gas. The following are found:
a unit for scrubbing with a liquid solvent, in order to remove the larger part of the acid gases present in the synthesis gas,
a unit for purification over a bed of adsorbents,
a unit for separation by the cryogenic route, "cold box", for the production of CO.

Generally, the synthesis gas comprises a mixture at high pressure (generally between 30 and 60 bar) and is very rich in CO (approximately 50 mol %). Another advantage of the coal gasification process is the low content of impurities ($CH_4$, argon and nitrogen) present in the synthesis gas at the inlet of the cold box for the production of pure CO.

This makes it possible to envisage a relatively simplified flowchart for the cold box, the cryogenic separation being limited to a separation between CO and hydrogen. The contents of inert substances in the synthesis gas are compatible with the CO purity required by the client in the majority of cases.

This flowchart does not comprise a cycle dedicated to separation.

The hydrogen separated from the CO is required at high pressure in order to be able to make economic use of it, either in a PSA or in a unit for the synthesis of methanol or other.

A portion of the separation energy of said cold box is provided by free expansion between the synthesis gas and the pure CO produced at low pressure but, in the majority of cases, this free expansion is not sufficient to complete the refrigeration balance of the unit. A supply of liquid nitrogen is necessary in order to keep the cold box cold and to complete the refrigeration balance.

The synthesis gas at a pressure generally of between 30 and 60 bar coming from a pretreatment unit ($CO_2$ and MeOH separation) is cooled in the main exchange line and partially condensed before feeding a one-stage partial condensation separator pot. The hydrogen-rich vapor is in the majority of cases conveyed to an MeOH unit or to a PSA after reheating in the exchange line. The bottom liquid is conveyed to a medium-pressure stripping column (about 14 bar) after expansion. The top vapor, known as flash gas, exits from the cold box after reheating and is conveyed as fuel or recycled material to the system via a compressor.

A stream withdrawn from the column at a level above the vessel bottom is subcooled to a certain temperature level, expanded, conveyed to a thermosiphon pot and then evaporated in the exchange line before being conveyed to the suction port of the CO compressor.

The bottom liquid from the stripping column is subcooled in the exchange line to a temperature level less cold than that of the stream mentioned above before being expanded, evaporated and reheated in the main exchange line and finally conveyed to an intermediate stage of the CO compressor.

A third stream can be withdrawn at another level of the column (a level above the bottom), subcooled to a temperature level different from the two preceding levels, expanded, evaporated and reheated in the exchange line.

The CO compressor makes it possible to compress the CO produced (which is the sum of all the liquid withdrawals from the stripping column) to the pressure required by the downstream unit (acetic acid or other).

The advantage of subcooling the flows of carbon monoxide to different temperature levels is to reduce the KS and the heat load and thus the capital cost of the main exchange line. The medium-pressure flow(s) is (are) subcooled to (a) temperature level(s) which is (are) less cold than if they were all mixed.

This makes it possible to reduce the electrical energy of the CO compressor 33, 35, 37. Less energy is consumed for the subcooling of the medium-pressure levels. Each of the CO-rich flows is subcooled only to a certain temperature level which prevents the creation of gas after expansion, which makes it possible to avoid having to install two-phase (liquid-gas) introduction pots for the main exchange line.

This makes it possible to have a low-pressure fluid rich in carbon monoxide (lowest pressure level at the thermosiphon pot 27) which can comprise more hydrogen than the bottom of the stripping column and thus makes it possible to have a low evaporation temperature for an identical pressure level and thus makes it possible to further cool the synthesis gas (for an identical $\Delta T$) and to improve the CO output of the unit. Alternatively, at an identical output, this makes it possible to reduce the electrical energy of the compressor as it is possible to increase the suction pressure of the compressor.

SUMMARY OF THE INVENTION

According to one subject matter of the invention, a process as claimed in claim 1 is provided for.
Optionally:
the first and second flows have different purities;
the first and second flows have the same purity;
at least one of the flows is withdrawn at the bottom of the stripping column;
the first flow is a flow withdrawn at the stripping column bottom which is cooled to a first temperature in the exchange line, is expanded and is then reheated in the exchange line and the second flow is withdrawn at an intermediate level of the stripping column, is cooled to a second temperature lower than the first temperature, is expanded and is then reheated in the exchange line;
the second flow, cooled to the second temperature, is conveyed to the separator pot;

a third flow is withdrawn at an intermediate level of the stripping column above or below that of the second flow, is cooled to a third temperature lower or greater than the first temperature and/or lower or greater than the second temperature, is expanded and is then reheated in the exchange line.

According to another subject matter of the invention, provision is made for a device for the cryogenic separation of a mixture of hydrogen and carbon monoxide optionally comprising low contents of methane, argon and nitrogen for the production of pure carbon monoxide by partial condensation in a stage comprising an exchange line, a stripping column, a first and a second separator pot, a carbon monoxide compressor comprising at least two stages, means for conveying the mixture to be cooled into the exchange line, means for conveying the cooled mixture to the first separator pot, means for withdrawing at least a portion of the liquid resulting from the partial condensation from the first pot, means for conveying this liquid to the top of the stripping column, means for diverting at least a first flow rich in carbon monoxide and a second flow rich in carbon monoxide from the stripping column, means for cooling the first and the second flows to a first and a second temperature respectively in the exchange line, means for conveying the first flow at the first temperature or the second flow at the second temperature to the second separator pot after expansion, means for reheating the gas from the separator pot in the exchange line and means for conveying the reheated gas to the first stage of the carbon monoxide compressor, means for reheating the second flow or the first flow in the exchange line and means for conveying the reheated second flow or the reheated first flow to a stage of the compressor downstream of the first stage.

Optionally, the device comprises:
means for withdrawing the at least first and second flows at the same level of the stripping column;
means for withdrawing the at least first and second flows at levels separated by at least one theoretical stage of the stripping column;
means for withdrawing at least the first flow at the bottom of the stripping column;
means for withdrawing the first flow at the bottom of the stripping column and/or means for withdrawing a second flow at a first intermediate level of the stripping column;
means for withdrawing a third flow at a level below or above the first intermediate level of the stripping column;
means for conveying the second flow, cooled in the exchange line, or the first flow, cooled in the exchange line, to a separator pot.

DETAILED DESCRIPTION OF THE INVENTION

For a further understanding of the nature and objects for the present invention, reference should be made to the detailed description, taken in conjunction with the accompanying drawing, in which like elements are given the same or analogous reference numbers and wherein:

The invention will be described in more detail with reference to the figures, which are diagrams of processes according to the invention.

Figure 1:
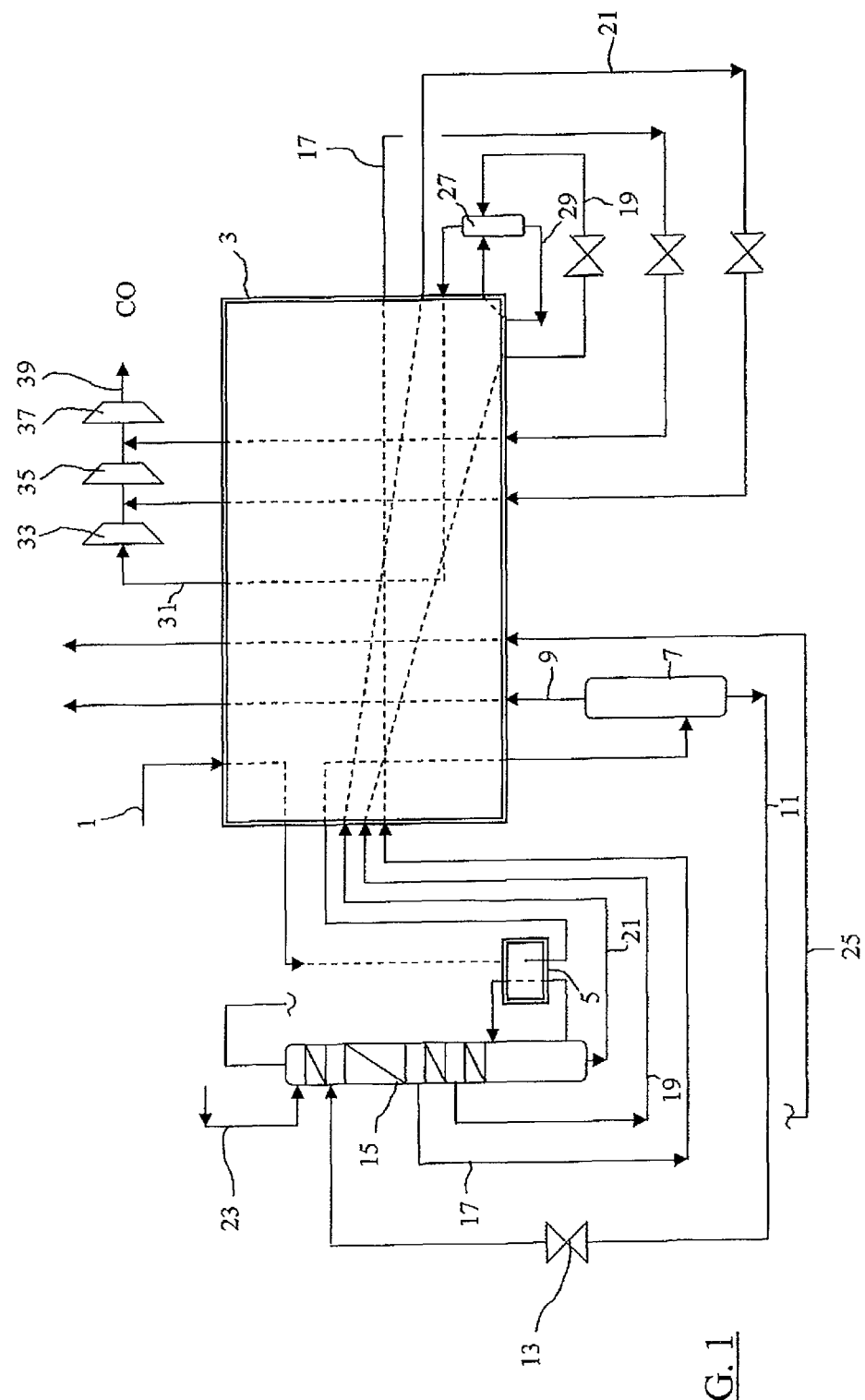
FIG. 1 illustrates one embodiment of the present invention.

In FIG. 1, a flow of synthesis gas 1 at a pressure generally of between 30 and 60 bar comprises hydrogen and carbon monoxide and optionally small amounts of methane, argon and nitrogen. It is cooled down to an intermediate level of the exchange line 3, is withdrawn and is used to reboil the bottom of the column 15 by means of an exchanger 5. Subsequently, the cooling of the synthesis gas is continued in the exchange line 3 and the synthesis gas is conveyed to a separator pot 7 where it is partially condensed. The top vapor 9 is reheated in the exchange line in order to form a hydrogen-rich flow. The bottom liquid 11 is expanded to 14 bar in a valve 13 and conveyed to the top of the stripping column 15, also fed at the top with injected liquid nitrogen. The liquid 19 withdrawn at an intermediate level of the stripping column 15 is subcooled in the exchange line 3 before being expanded and sent to a thermosiphon pot 27. The bottom liquid 29 from the pot 27 is evaporated in the exchange line 3 with a thermosiphon operation and the top gas 31 is conveyed to the suction port of the first stage 33 of the CO compressor.

The bottom liquid 21 from the stripping column 15 is subcooled in the exchange line 3 to a temperature level less cold than that of the withdrawn liquid set out above, expanded and then evaporated in the exchange line 3 to feed the compressor at an intermediate stage 35 of the CO compressor.

A third flow 17 is withdrawn at an intermediate level of the column different from the flow 19 (can be withdrawn at a level higher or lower than the flow 19) and is subcooled to a temperature level less cold than that of the flow 19. Subsequently, this flow is expanded and then evaporated in the exchange line 3 to feed the compressor at a stage 37 of the CO compressor.

The three flows 17, 19, 21 are expanded to different pressures before being evaporated.

The three mixed flows 17, 19, 21, after evaporation and reheating, form the carbon monoxide product 39.

Figure 2:
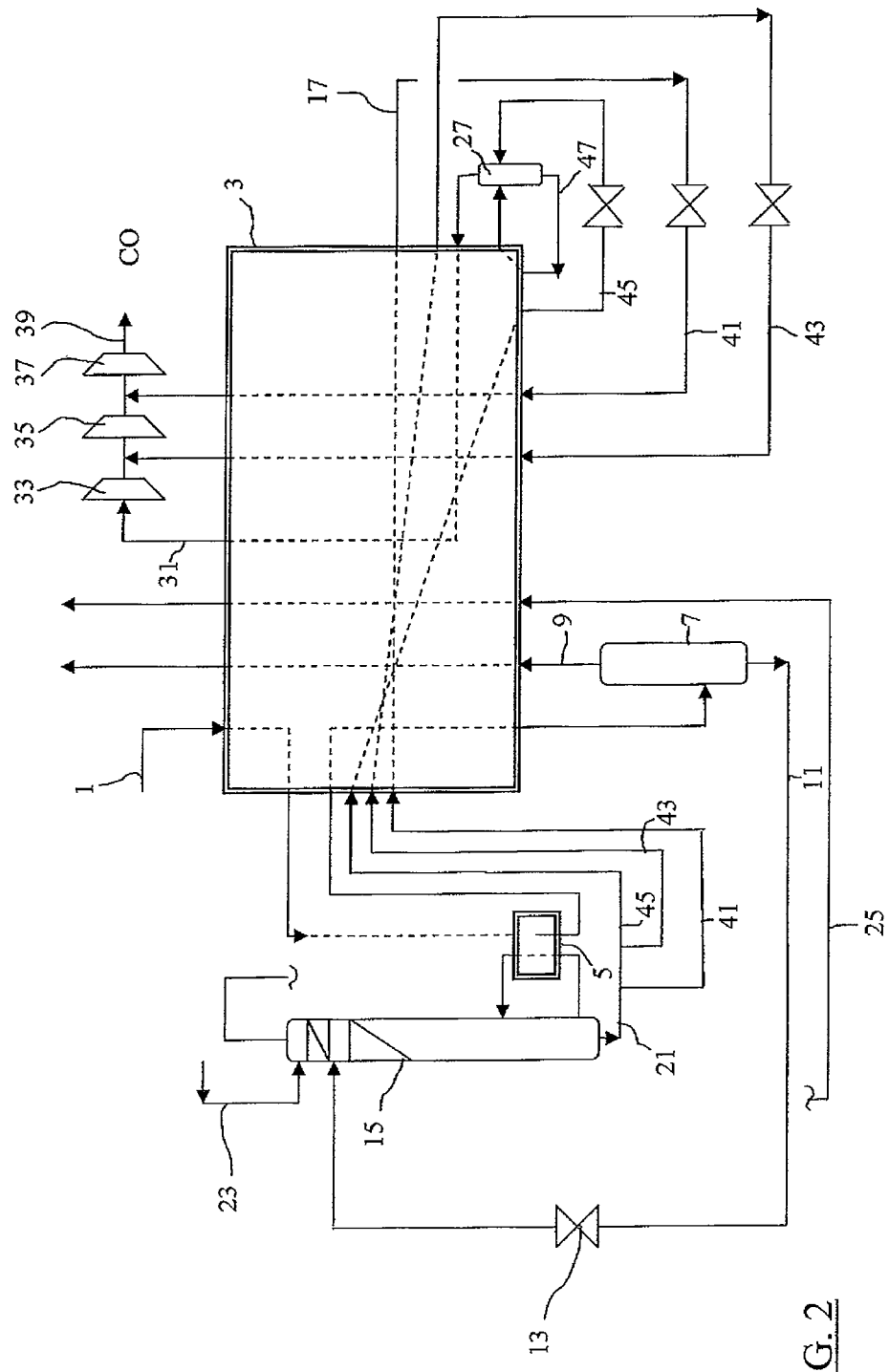
FIG. 2 illustrates another embodiment of the present invention.

In FIG. 2, a flow of synthesis gas 1 at a pressure generally of between 30 and 60 bar comprises hydrogen and carbon monoxide and optionally small amounts of methane, argon and nitrogen. It is cooled down to an intermediate level of the exchange line 3, is withdrawn and is used to reboil the bottom of the column 15 by means of an exchanger 5. Subsequently, the cooling of the synthesis gas is continued in the exchange line 3 and the synthesis gas is conveyed to a separator pot 7 where it is partially condensed. The top vapor 9 is reheated in the exchange line in order to form a hydrogen-rich flow. The bottom liquid 11 is expanded to a pressure of about 14 bar in a valve 13 and conveyed to the top of the stripping column 15, also fed at the top with injected liquid nitrogen. The bottom liquid 21 from the stripping column 15 is divided into three fractions 41, 43, 45, which are each subcooled to a different temperature in the exchange line 3 before being expanded. The first flow 45 is conveyed to a thermosiphon pot 27. The bottom liquid 47 from the pot is evaporated in the exchange line 3 with a thermosiphon operation and the top gas 31 is conveyed to the suction port of the first stage 33 of the CO compressor.

The other flows 41, 43 are expanded to different pressures and are then evaporated in the exchange line 3 to feed the compressor at intermediate stages 35 and 37 of the CO compressor.

The three flows 41, 43, 45 are expanded to different pressures before being evaporated.

The three mixed flows 41, 43, 45 form the carbon monoxide product 39.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A process for the cryogenic separation of a mixture of hydrogen and carbon monoxide for the production of pure CO, the process comprising the steps of:
    cooling the mixture by a single stage of partial condensation in an exchange line;
    introducing at least a portion of liquid resulting from the partial condensation into the top of a stripping column;
    withdrawing at least a first flow rich in carbon monoxide and a second flow each in carbon momoxide from the stripping column in the liquid form and introducing to the exchange line, the exchange line configured to cool the first flow and the second flow to different temperatures;
    removing the first flow from the exchange line and expanding the first flow;
    introducing the expanded first flow to a separator pot, thereby producing a first vapor and a first liquid;
    reheating the first liquid in the exchange line and reintroducing the first liquid to the separator pot;
    heating the first vapor in the exchange line before introducing the first vapor to the first stage of a carbon monoxide compressor comprising at least two stages;
    removing the second flow from the exchange line and expanding the second flow;
    introducing the expanded second flow to the exchange line for heating before introducing the expanded second flow;
    to a stage of the carbon monoxide compressor downstream of the first stager,
    wherein the first vapor and the second flow are introduced to the exchange line at different pressures,
    wherein the expansion of the first liquid and the second flow provide at least a portion of the separation energy.

2. The process of claim 1, wherein the first flow and second flow have different purities.

3. The process of claim 1, wherein the first flow and second flow have the same purity.

4. The process of claim 1, wherein at least one of the first flow and second flow is withdrawn at the bottom of the stripping column.

5. The process of claim 1, wherein the mixture additionally comprises low contents of methane, argon and nitrogen.

6. A device for the cryogenic separation of a mixture of hydrogen and carbon monoxide for the production of pure CO by partial condensation in a single stage, the device comprising:
    an exchange line configured to receive and cool the mixture to a temperature suitable for the cryogenic separation of hydrogen and carbon monoxide;
    a stripping column having a top portion and a bottom portion, wherein the stripping column is in fluid communication with the exchange line such that the stripping column is configured to send at least a first flow rich in carbon monoxide and a second flow rich in carbon monoxide from the stripping column to the exchange line;
    a first separator pot in fluid communication with a cold end of the exchange line, the first separator pot configured to separate gas and liquid phases of the mixture, the first separator pot having a liquid outlet in fluid communication with the top portion of the stripping column;
    a second separator pot in fluid communication with the exchange line, the second separator pot configured to receive either the first flow or the second flow following cooling in the exchange line, the second separator pot configured to separate the received stream into a second gas and a second liquid, the second separator pot configured to send the second gas to the cold end of the exchange line;
    a valve in fluid communication with the exchange line and configured to expand the other flow of the first flow and second flow which was not received by the second separator pot and then reheating said other flow in the exchange line;
    a carbon monoxide compressor comprising a first stage and a second stage the first stage and the second stage in fluid communication with a warm end of the exchange line, the first stage configured to receive the second gas from the exchange line after the second gas has been reheated the second stage configured to receive said other flow from the exchange line, wherein the second stage is located downstream the first stage;
    wherein the exchange line is configured to cool the first flow to a first temperature and cool the second flow to a second temperature, wherein the first temperature and the second temperature are different.

7. The device of claim 6, wherein the stripping column is configured to withdraw first flow and the second flow at the same level of the stripping column.

8. The device of claim 6, wherein the stripping column is configured to withdraw first flow and the second flow at levels separated by at least one theoretical stage of the stripping column.

9. The device of claim 6, wherein the stripping column is configured to withdrawn the first flow at the bottom of the stripping column.

10. The device of claim 6, wherein the mixture additionally comprises low contents of methane, argon and nitrogen.

11. A process for the cryogenic separation of a mixture of hydrogen and carbon monoxide for the production of pure CO by partial condensation in a stage in which the mixture is cooled in an exchange line, the method comprising the steps of:
    partially condensing at least a portion of the mixture and introducing the liquid resulting from the partial condensation to the top of a stripping column;
    withdrawing at least a first flow rich in carbon monoxide and a second flow rich in carbon monoxide from the stripping column in liquid form and introducing at least the first flow and the second flow to the exchange line, wherein the first flow and the second flow are cooled in the exchange line to different temperatures;
    introducing one of the first flow and second flow to a separator pot after expansion;
    reheating gas from the separator pot in the exchange line before introducing said gas to a first stage of a carbon monoxide compressor comprising at least two stages; and
    expanding the other of the first flow and the second flow and then reheating said other of the first flow and the second flow in the exchange line before introducing said other of the first flow and the second flow to a downstream stage of the compressor, wherein the downstream stage is downstream of the first stage,
    wherein the gas from the separator pot and the other of the first flow and the second flow are reheated in the exchange line at different pressures, wherein the expansion of the first flow and the second flow provides at least a portion of the separation energy of the cold box.

12. The process as claimed in claim 11, in which the first flow and the second flow have different purities.

13. The process as claimed in claim 11, in which the first flow and the second flow have the same purity.

14. The process as claimed in claim 11, in which at least one of the flows is withdrawn at a bottom portion of the stripping column.

15. The process as claimed in claim 14, in which the first flow is a flow withdrawn at the bottom portion of the stripping column which is cooled to a first temperature in the exchange line (3), is expanded and is then reheated in the exchange line and the second flow (19) is withdrawn at an intermediate level of the stripping column, is cooled to a second temperature lower than the first temperature, is expanded and is then reheated in the exchange line.

16. The process as claimed in claim 15, in which the second flow, cooled to the second temperature, is conveyed to the separator pot (27).

\* \* \* \* \*